(12) United States Patent
Chatroux et al.

(10) Patent No.: US 11,171,342 B2
(45) Date of Patent: Nov. 9, 2021

(54) SYSTEM FOR REGULATING THE TEMPERATURE AND PRESSURE OF A HIGH-TEMPERATURE ELECTROLYSER (SOEC) REVERSIBLY OPERATING AS A FUEL CELL STACK (SOFC)

(71) Applicant: COMMISSARIAT A L'ENERGIE ATOMIQUE ET AUX ENERGIES ALTERNATIVES, Paris (FR)

(72) Inventors: Andre Chatroux, Tullins (FR); Stephane Di Iorio, Lans en Vercors (FR); Thomas Donnier-Marechal, Grenoble (FR); Pascal Giroud, Saint Martin d'Uriage (FR); Michel Planque, Seyssins (FR); Magali Reytier, Villard de Lans (FR); Guilhem Roux, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 412 days.

(21) Appl. No.: 16/322,654

(22) PCT Filed: Jul. 28, 2017

(86) PCT No.: PCT/EP2017/069150
§ 371 (c)(1),
(2) Date: Feb. 1, 2019

(87) PCT Pub. No.: WO2018/024628
PCT Pub. Date: Feb. 8, 2018

(65) Prior Publication Data
US 2020/0358112 A1 Nov. 12, 2020

(30) Foreign Application Priority Data
Aug. 3, 2016 (FR) ...................... 1657537

(51) Int. Cl.
*H01M 8/04* (2016.01)
*H01M 8/04014* (2016.01)
(Continued)

(52) U.S. Cl.
CPC ......... *H01M 8/04014* (2013.01); *C25B 15/02* (2013.01); *C25B 15/08* (2013.01);
(Continued)

(58) Field of Classification Search
CPC ...................................................... H01M 8/02
See application file for complete search history.

(56) References Cited

U.S. PATENT DOCUMENTS

2002/0081471 A1 6/2002 Keegan et al.
2003/0207164 A1 11/2003 McElroy et al.
(Continued)

FOREIGN PATENT DOCUMENTS

CA 2 446 360 A1 4/2004
EP 1 202 366 A2 5/2002
(Continued)

OTHER PUBLICATIONS

Office Action dated Mar. 9, 2020 in corresponding Japanese Patent Application No. 2019-505396 (with English Translation), 6 pages.
(Continued)

*Primary Examiner* — Jacob B Marks
(74) *Attorney, Agent, or Firm* — Oblon, McClelland, Maier & Neustadt, L.L.P.

(57) ABSTRACT

The invention relates to a system able to operate reversibly as an SOFC fuel-cell stack or as an SOEC electrolyser. According to the invention, a bypass line or circuit is provided in order to divert if needs be some of the hot gases issued from the chambers referred to as oxygen chambers (anodic chambers in SOEC mode, cathodic chambers in SOFC-stack mode) as this will cool the heat exchanger provided in the circuit through which the oxygen flows.

14 Claims, 3 Drawing Sheets

(51) Int. Cl.
 C25B 15/02 (2021.01)
 C25B 15/08 (2006.01)
 H01M 8/04119 (2016.01)
 H01M 8/04746 (2016.01)
 H01M 8/12 (2016.01)
 H01M 8/124 (2016.01)

(52) U.S. Cl.
 CPC ... H01M 8/04164 (2013.01); H01M 8/04753 (2013.01); H01M 8/12 (2013.01); H01M 2008/1293 (2013.01)

(56) References Cited

U.S. PATENT DOCUMENTS

| 2004/0245385 A1 | 12/2004 | McElroy et al. |
| 2007/0231650 A1 | 10/2007 | Jiang et al. |
| 2009/0061270 A1 | 3/2009 | Tsunoda |
| 2011/0048484 A1 | 3/2011 | Gao et al. |
| 2013/0302708 A1 | 11/2013 | Kamijo |
| 2014/0329160 A1* | 11/2014 | Ramaswamy ........ H01M 8/086 429/434 |

FOREIGN PATENT DOCUMENTS

| JP | 2002-252003 A | 9/2002 |
| WO | WO 2010/004093 A1 | 1/2010 |
| WO | WO 2011/110676 A1 | 9/2011 |
| WO | WO 2015/040270 A1 | 3/2015 |

OTHER PUBLICATIONS

International Search Report dated Sep. 25, 2017 in PCT/EP2017/069150 filed on Jul. 28, 2017.
French Preliminary Search Report dated Mar. 31, 2017 in Patent Application No. 1657537 filed on Aug. 3, 2016.

\* cited by examiner

SYSTEM FOR REGULATING THE TEMPERATURE AND PRESSURE OF A HIGH-TEMPERATURE ELECTROLYSER (SOEC) REVERSIBLY OPERATING AS A FUEL CELL STACK (SOFC)

TECHNICAL FIELD

The present invention relates to the field of solid oxide fuel cells (SOFC) and that of high-temperature electrolysis of water (HTE, or else HTSE, acronym for high-temperature steam electrolysis) also using solid oxides (SOEC, acronym for solid oxide electrolysis cell).

The invention relates more particularly to the control of the temperature and of the internal pressure of an SOEC electrolyzer system or of an SOFC fuel cell that may be the electrolyzer system operating reversibly.

Although mainly described with reference to a high-temperature water electrolysis application, the invention applies just as well to an SOFC fuel cell.

PRIOR ART

The electrolysis of water is an electrolytic reaction that decomposes water into gaseous dioxygen and dihydrogen by means of an electrical current, according to the reaction:

$$H_2O \rightarrow H_2 + 1/2\ O_2$$

It is advantageous to carry out the electrolysis of water at high temperature, typically between 600 and 950° C., as some of the energy required for the reaction may be supplied by heat, which is less expensive than electricity, and activation of the reaction is more efficient at high temperature and does not require a catalyst.

As depicted in FIG. 1, a solid oxide electrolysis cell 10 or SOEC in particular comprises:

a first porous conductive electrode 12, or "cathode", intended to be supplied with steam for the production of dihydrogen;

a second porous conductive electrode 14, or "anode", via which the dioxygen ($O_2$) produced by the electrolysis of the water injected onto the cathode escapes; and a solid oxide membrane (dense electrolyte) 16 sandwiched between the cathode 12 and the anode 14, the membrane 16 being anionically conductive at high temperatures, usually temperatures above 600° C.

By heating the cell 10 at least to this temperature and by injecting an electric current I between the cathode 12 and the anode 14, water is then reduced at the cathode 12, thereby generating dihydrogen ($H_2$) at the cathode 12 and dioxygen at the anode 14.

It is known to use an SOEC (acronym of "solid oxide electrolysis cell") electrolyzer to implement high-temperature electrolysis, said electrolyzer consisting of a stack of individual units that each comprise a solid oxide electrolysis cell, consisting of three anode/electrolyte/cathode layers superposed on one another, and of interconnecting plates made of metal alloys, also referred to as bipolar plates or interconnectors. The function of the interconnectors is both to let electric current pass and gases flow to each cell (injected steam and extracted hydrogen and oxygen in an HTE electrolyzer; injected air and hydrogen and extracted water in an SOFC cell) and to separate the anode and cathode compartments, which are the gas-flow compartments on the anode side and the cathode side of the cells, respectively. To carry out high-temperature electrolysis (HTE) of steam, steam ($H_2O$) is injected into the cathode compartment. Under the action of the current applied to the cell, dissociation of water molecules in steam form takes place at the interface between the hydrogen electrode (cathode) and the electrolyte: this dissociation produces dihydrogen gas ($H_2$) and oxygen ions. The dihydrogen is collected and discharged at the outlet of the hydrogen compartment. The oxygen ions ($O^{2-}$) migrate through the electrolyte and recombine into dioxygen at the interface between the electrolyte and the oxygen electrode (anode).

A stack 20 of electrolysis cells that is intended to produce a large amount of hydrogen is illustrated in the schematic diagram of FIG. 2. In particular, the cells 10 re stacked on one another and are separated by interconnecting plates 18 that are connected to a supply 22 of steam with a view to injecting this steam onto the cathodes of the cells 10 at a steam flow rate $D_{H_2O}$ that is adjusted by a controllable valve 24. The plates 18 are also connected to a gas collector 26 for collecting the gases generated by the electrolysis.

An example of an interconnecting-plate structure and stack is described in patent application WO 2011/110676.

Such an electrolyzer may also operate in a co-electrolysis mode, i.e. a mode in which a gas mixture composed of steam ($H_2O$) and carbon dioxide ($CO_2$) is fed to the cathode compartment. The mixture output from the cathode compartment is then composed of hydrogen ($H_2$), steam ($H_2O$), carbon monoxide (CO) and carbon dioxide ($CO_2$).

To actually implement electrolysis with the stack 20, the stack is raised to a temperature above 600° C., usually a temperature comprised between 600° C. and 950° C., the supply of gas is started at constant flow rate and an electrical power supply 28 is connected across two terminals 30, 32 of the stack 20 in order to make the current I flow therethrough.

In the prior art, a distinction is made between two types of operation of a HTSE stack: operation in potentiostatic mode and operation in galvanostatic mode.

In potentiostatic operation, the voltage between the terminals 30, 32 of the stack 20 is kept constant, the supply 28 being for example a constant voltage source, which makes it possible to keep the thermal regime of the stack 20 constant, but not the production of hydrogen.

In galvanostatic operation, the intensity of the current I injected into the stack is kept constant, the electrical supply 28 being for example a constant current source, which makes it possible to keep the production of hydrogen constant, but in this case the thermal balance may lead to a change in temperature of the stack.

The operating point retained for a reactor also sets the thermal conditions in the stack. Indeed, for electrolyses carried out at high temperature, the energy ΔH required for dissociation of the inlet molecule ($H_2O$ or $CO_2$) may be provided in electrical and/or heat form. The thermal energy provided Q is then defined as a function of the voltage U at the terminals of each electrolysis cell by the relationship:

$$Q = \frac{I}{2F}\Delta H - U \cdot I,$$

in which U is the electrical voltage, I is the electric current and F is the Faraday constant.

Thus, three operating regimes are defined for the electrolysis or the co-electrolysis, corresponding to three different thermal modes for the stack of cells:

the "autothermal" mode in which the imposed voltage is equal to ΔH/2F. The heat consumed by the dissociation reaction is completely compensated for by the various electrical resistances of the electrolyzer (irreversibilities). The electrolyzer does not require any particular thermal management, while at the same time remaining temperature-stable.

the "endothermic" mode in which the imposed voltage is less than $\Delta H/2F$. The electrolyzer consumes more heat than the electrical losses therein. This required heat must thus be supplied thereto by another means, otherwise its temperature will drop irreparably.

the "exothermic" mode in which the imposed voltage is greater than $\Delta H/2F$. The electrolysis then consumes less heat than the electrical losses via the Joule effect. This release of heat within the electrolyzer must then be discharged by another means, otherwise its temperature will increase unacceptably.

Moreover, after a few hundred hours of operation, degradation phenomena appear in the stack in the form of an increase in the electrical resistivity.

When operating in potentiostatic mode, the degradation phenomena are expressed by a drop in the intensity of electric current I injected into the stack, which leads to a reduction in the amount of hydrogen produced, in the degree of conversion of steam to hydrogen and in the energy efficiency at constant inlet flow rate. This mode of operation does not make it possible to meet the industrial need for a defined and constant production of hydrogen.

Conversely, operation in galvanostatic mode does make it possible to meet the need for a defined and constant production of hydrogen. In this case, the degradation phenomena are expressed in the form of an increase in the voltage and of the ohmic losses. The electrolyzer therefore still produces the same amount of hydrogen, but this leads to a change in thermal regime which may be difficult to manage, particularly when the thermal regime becomes highly exothermic. The solution generally adopted then consists in reducing the temperature of the furnace containing the stack and therefore of discharging the excess heat of the stack to the walls of the furnace by convection and radiation. An increase in the flow rate of purge gas of the furnace also makes it possible to discharge a portion of this excess heat. However, these actions make it possible to cool the periphery of the stack at the expense of a significant temperature gradient between the center and the wall of the stack.

A high-temperature solid oxide fuel cell, better known as an SOFC fuel cell, and an HTSE electrolyzer may have identical structures, only their operating mode being different. With reference to FIG. 3, a constituent electrochemical cell of an SOFC fuel cell stack comprises the same elements, namely the anode 12, the cathode 14 and the electrolyte 16, as an electrolysis cell.

Considering one cell of the fuel cell stack, dihydrogen or another fuel such as methane $CH_4$ is supplied, at constant flow rate, to its anode, and pure dioxygen, or dioxygen contained in air, is supplied, at constant flow rate, to its cathode, and the cell is connected to a load C in order to deliver the produced electrical current.

In a similar manner to the electrolyzer, an SOFC fuel cell is operated, either in galvanostatic mode, requiring that the fuel cell produces a constant current, or in potentiostatic mode, requiring that the fuel cell delivers a constant electric voltage.

The operation of the fuel cell under hydrogen, as fuel, is always exothermic but for a defined operating point, there is the same problem of thermal control in the fuel cell as in an electrolyzer.

Furthermore, hydrogen is not the only fuel possible for an SOFC fuel cell. Methane ($CH_4$) has particular properties with a highly endothermic internal reforming reaction: $CH_4+H_2O \rightarrow 3H_2+CO$. This internal reforming reaction is catalyzed by the nickel-zirconia cermet of the electrode 12, whereas the hydrogen oxidation reaction within the stack 20 is highly exothermic.

The operation of the fuel cell with $CH_4$ as fuel may therefore be either endothermic or exothermic and may lead to large temperature variations within the stack. However, the SOFC fuel cell is a more advanced technology from the industrial viewpoint and several solutions have already been implemented and described in the patent literature hereinbelow.

The property of endothermicity of the internal methane reforming reaction may be used to control the thermics of a stack. Patent application US 2007/0231650 recommends this solution: a controlled injection of $CH_4$ over the entire surface of the cells of the stack so as to adjust the level of internal reforming. Thus, it is possible to regulate the temperature of the stack by acting on the flow rate of $CH_4$ so that the amount of energy absorbed by the methane reforming reaction compensates for the amount of energy emitted by the hydrogen oxidation reaction.

In order to optimize the energy efficiency, the preheating of the gases at the inlet of the stack should be carried out by recovering the heat from gases leaving the stack. Heat exchangers are used for this. All the combinations of exchangers are disclosed in various patents.

Thus, application US 2003/0207164 describes the use of an exchanger between the outlet of the anode compartments and the inlet of these same anode compartments and of another exchanger between the outlet of the cathode compartments and the inlet of these same compartments.

Application WO 2010/004093A1 itself discloses the use of an exchanger between the outlet of the cathode compartments and the inlet of the anode compartments and of another exchanger between the outlet of the anode compartments and the inlet of the cathode compartments.

Finally, patent CA 2446360 discloses an arrangement with a single exchanger preheating the inlets of the anode and cathode compartments with the recombined outlet gases via a catalytic combustor.

In certain cases, the exchangers used have a dual role of thermal insulation of the stack, such as for example in patent application EP 1 202 366, which discloses an arrangement in which the exchanger is around the stack so as to confine the high-temperature zone and have a cold outer wall, which enables a reduction in the volume of thermal insulating materials, which is advantageous in the case of applications of the SOFC fuel cell in transport.

The aforementioned exchangers are still passive devices brought to high temperature and it is not possible to adjust the degree of heat exchange during the operation of the stack.

Patent JP 2002/252003 proposes a solution for reducing, if need be, the degree of heat exchange necessary, which consists of the installation of a fluid bypass circuit at the inlet of the exchanger on the air supply side. Thus, the air supplying the SOFC fuel cell may be heated by the exchanger or arrive colder if the bypass circuit is open.

Sized for a flow rate range suitable for an SOFC fuel cell, the bypass circuit is a good solution for this particular case, but this is not best suited for a reversible SOFC fuel cell/SOEC electrolyzer system. Specifically, the reversibility imposes constraints that have not been taken into consideration in the solution of patent JP 2002/225003.

These constraints are now described in detail.

The reversible operation of a stack implies that this stack be capable of operating with a very large range of flow rates, in particular on the air side. The air flow rate is in fact around 10 times greater in SOFC fuel cell mode than in SOEC electrolyzer mode. This results in a pressure variation that it is difficult for the seals used in the stack to tolerate.

Patent application US 2002/0081471 proposes a solution that consists of a control of the pressure of the gas at the inlet of the stack and the pressure regulation of an enclosure containing the stack, so as to limit the difference in pressure on the seals. This makes it possible to balance the pressure difference between the pressure inside the stack and the pressure in the enclosure that contains the stack. However, this solution does not make it possible to limit the pressure inside the stack. It should furthermore be noted that the solution according to this patent is implemented solely on an SOFC fuel cell but not on a reversible SOFC/SOEC system.

In other words, there is no satisfactory solution in the prior art relating to high-temperature fuel cells and electrolyzers that makes it possible both to manage the thermics and the pressure inside the stack for a reversible SOFC/SOEC system, i.e. a system that operates for an SOEC electrolyzer used reversibly as an SOFC fuel cell.

There is therefore a need to improve the thermal control and the control of the pressure inside a stack of solid oxide electrochemical cells operating reversibly either as SOFC fuel cell or as SOEC electrolyzer.

The aim of the invention is to at least partially meet this need.

SUMMARY OF THE INVENTION

To achieve this, the invention relates, according to a first alternative, to a system comprising:

a high-temperature electrolysis or co-electrolysis (HTE) reactor comprising a stack of individual solid oxide (co-)electrolysis cells each comprising a cathode, an anode, and an electrolyte inserted between the anode and the cathode, the cells being electrically connected in series, the stack comprising two electrical terminals for supplying current to the cells and defining, on the cathodes, first flow chambers and, on the anodes, second flow chambers;

at least one first supply line, capable of supplying the inlet of the first chambers with a mixture of steam and hydrogen or with a mixture of steam, hydrogen and carbon dioxide, at a flow rate $D_H$;

at least one second supply line, capable of supplying the inlet of the second chambers with air or with oxygen or with a mixture of oxygen-containing gases, at a flow rate $D_O$;

at least one first discharge line, capable of discharging the hydrogen produced at the outlet of the first chambers;

at least one second discharge line, capable of discharging the oxygen produced at the outlet of the second chambers;

a first heat exchanger, arranged between the second supply line and the second discharge line, so as to recover the heat from the gases leaving the second chambers and transfer it to the gases entering these same chambers in order to preheat said gases;

a bypass line of the second discharge line, arranged between the inlet and the outlet of the exchanger, so as to divert all or some of the gases from the outlet of the second chambers, the portion or all of the gases diverted not then flowing through the exchanger;

a flow control valve, capable of allowing through a flow rate of from 0 to 100%, arranged on the bypass line.

According to a second alternative, the system comprises:

a high-temperature fuel cell (SOFC) comprising a stack of individual solid oxide electrochemical cells each comprising an anode, a cathode, and an electrolyte inserted between the anode and the cathode, the cells being electrically connected in series, the stack comprising two electrical terminals for recovering current from the cells and defining, on the anodes, first flow chambers and, on the cathodes, second flow chambers;

at least one first supply line, capable of supplying the inlet of the first chambers with dihydrogen or with another fuel gas or with a mixture containing a fuel gas, at a flow rate $D_H$;

at least one second supply line, capable of supplying the inlet of the second chambers with air or with oxygen or with a mixture of oxygen-containing gases, at a flow rate $D_O$;

at least one first discharge line, capable of discharging the excess dihydrogen or other fuel at the outlet of the first chambers;

at least one second discharge line, capable of discharging the excess air or oxygen or mixture of oxygen-containing gases at the outlet of the second chambers;

a first heat exchanger, arranged between the second supply line and the second discharge line, so as to recover the heat from the gases leaving the second chambers and transfer it to the gases entering these same chambers in order to preheat said gases;

a bypass line of the second discharge line, arranged between the inlet and the outlet of the exchanger, so as to divert all or some of the gases from the outlet of the second chambers, the portion or all of the gases diverted not then flowing through the exchanger;

a first flow control valve, capable of controlling a flow rate of from 0 to 100%, arranged on the bypass line.

The system may be reversible, the SOFC fuel cell possibly being a high-temperature electrolyzer and vice versa.

According to one advantageous embodiment, provision is further made for a second heat exchanger, arranged between the first supply line and the first discharge line, so as to recover the heat from the gases leaving the first chambers and transfer it to the gases entering these same chambers in order to preheat said gases.

According to this embodiment, one advantageous embodiment variant consists in providing a second flow control valve, capable of controlling a flow rate of from 0 to 100%, arranged on the second discharge line downstream of the outlet of the second heat exchanger.

Still according to this embodiment, the system further comprises a condenser arranged upstream of the second valve and sized in order to remove the steam from the gas mixture flowing in the second discharge line of the first chambers, and to enable operation of the second valve at cooled temperature, preferably at ambient temperature.

According to another advantageous embodiment variant, the system further comprises a third flow control valve, capable of controlling a flow rate of from 0 to 100%, arranged on the second discharge line downstream of the outlet of the first heat exchanger.

According to this other variant, provision is advantageously made for a cooler arranged between the bypass line and the second discharge line of the second chambers, and upstream of the first and third valve. This cooler is sized so as to cool the gas mixture flowing both in the bypass line and in the second discharge line and to enable operation of said first and third valves at cooled temperature, preferably at ambient temperature.

Preferably, the cooler is a condenser comprising a device for purging the condensed liquid water.

Again advantageously, the system may further comprise:

a first external heat source arranged on the first supply line at the inlet of the first chambers, if necessary downstream of the second heat exchanger, to provide additional heat, in order to supplement the heating of the gases on said first line; and/or a second external heat source arranged on the second supply line at the inlet of the second chambers, and downstream of the first heat exchanger, to provide additional heat, in order to supplement the heating of the gases on said line.

Thus, the invention consists in inserting a bypass line or circuit in order to divert, if necessary, a portion of the hot gases from the oxygen chambers (anode chambers in SOEC mode, cathode chambers in SOFC fuel cell mode), which will cool the heat exchanger inserted in the oxygen flow circuit.

This enables less preheating and therefore makes it possible to lower the temperature of the gases entering the oxygen chambers, and thereby to lower the temperature of the entire stack of electrochemical cells. The result obtained from the thermal point of view is similar to that of the system described in patent JP 2002/225003, but with the additional advantage of being able to also lower the pressure within the oxygen chambers. Specifically, the bypass line according to the invention is provided at the outlet of the gases (and not at the inlet), the pressure drop induced by the bypass line is lower than that of the exchanger, which makes it possible to lower the pressure of the oxygen chambers.

Thus, according to the invention, the partial or total opening of the control valve on the bypass line makes it possible to obtain both a drop in the temperature of the stack of cells and a drop in the pressure in the oxygen chambers.

This is a very considerable advantage for a system that may operate reversibly as SOFC fuel cell or as SOEC electrolyzer since the flow rate of air that must be provided in SOFC fuel cell mode is much greater than in SOEC mode. The internal pressure of the oxygen chambers is therefore greater in SOFC fuel cell mode and the temperature of the stack is also higher since this mode is always exothermic. The use only of the bypass line when passing from SOEC electrolysis mode to SOFC fuel cell mode makes it possible to simultaneously oppose the increases in pressure and in temperature.

Thus, in SOEC electrolysis mode, the valve on the bypass line will for the most part be kept closed in order to maximize the heat exchange in the exchanger between the inlet and outlet of the oxygen chambers, so as to have a good energy efficiency, the supply of thermal energy by the reaction proper of the electrolyzer making it possible to reduce the portion of electrical energy.

In this SOEC mode, the flow rate of gas in the oxygen chambers and in the heat exchanger is of the order of 10 times lower than in SOFC fuel cell mode, which explains why the internal pressure of the oxygen chambers remains low, even with the valve of the bypass line which remains closed.

Furthermore, the additional heat exchanger on the side of the hydrogen chambers makes it possible to recover the heat from the gases leaving these chambers in order to preheat the incoming gases. This makes it possible to considerably improve the energy efficiency of the system in SOEC mode, the supply of thermal energy by the electrolysis reaction making it possible to reduce the portion of electrical energy.

In SOFC fuel cell mode, this additional exchanger is useful for preheating the fuel gases and preventing too high a thermal gradient between the inlet and the outlet of the hydrogen chambers. This additional exchanger is also an advantage when the SOFC fuel cell is supplied with methane, since the preheating of the methane to a temperature of around 700° C. enables the endothermic reforming reaction according to the equation below:

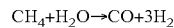

$$CH_4 + H_2O \rightarrow CO + 3H_2$$

This reforming reaction, inside the fuel cell, is catalyzed by the hydrogen electrodes, preferably made of nickel-zirconia cermet, which therefore makes it possible to rapidly provide hydrogen within the fuel cell for the operation thereof.

The two additional control valves, each at the outlet of a gas discharge line, make it possible the to reduce the gas passage diameter at the outlets of the hydrogen and oxygen chambers. Via this passage reduction, these valves increase the local pressure drop, which has the effect of increasing the pressure of all the upstream gas lines and chambers.

Thus, owing to these two additional control valves, it is possible to balance the pressures on the one hand in the hydrogen chambers and on the other hand in the oxygen chambers, which is an advantage, since this limits the mechanical stresses on the electrochemical cells and on the seal between these two types of chambers. These valves make it possible to manage, downstream, the pressure of each of the chambers, even if the flow rates that circulate therein are very different.

Consequently, in SOFC fuel cell mode, if the opening of the valve does not make it possible to sufficiently lower the pressure of the oxygen chambers until an equilibrium with the hydrogen chambers is obtained, the partial closure of the valve on the hydrogen discharge line makes it possible to increase the pressure of the hydrogen chambers and to obtain the desired equilibrium.

Similarly, in exothermic SOEC electrolysis mode, the valve on the bypass line could be opened partially in order to reduce the temperature of the stack. This will have the consequence of also lowering the pressure in the oxygen chambers, which is not useful in SOEC mode where the flow rate of air in these chambers is low.

To counteract this drop, it will be possible to partially close the valve on the oxygen discharge line, which will increase the pressure in the oxygen chambers until an equilibrium with the hydrogen chambers is obtained.

DETAILED DESCRIPTION

Other advantages and features of the invention will become more clearly apparent on reading the detailed description of examples of implementation of the invention, given by way of non-limiting illustration with reference to the following figures, in which.

Figure 1:
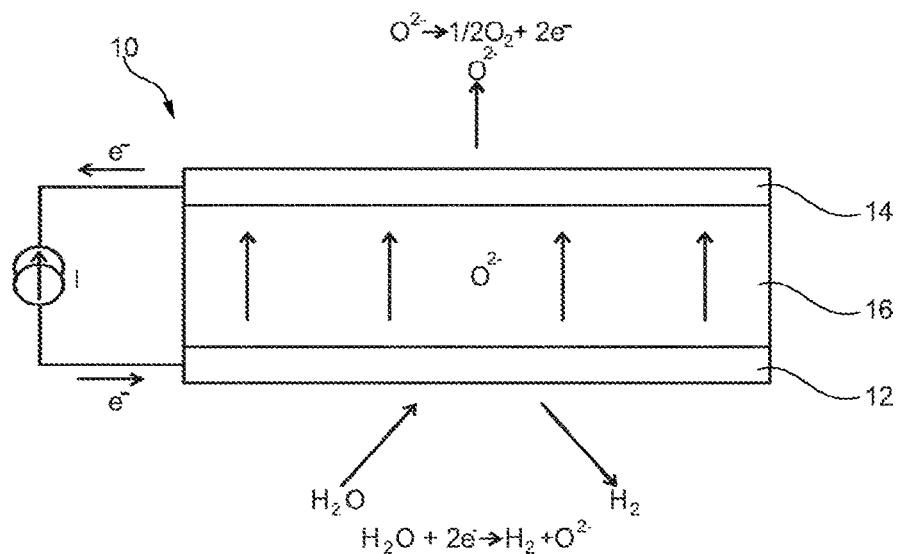
FIG. 1 is a schematic view of an individual electrochemical cell of an HTSE electrolyzer.
Figure 2:
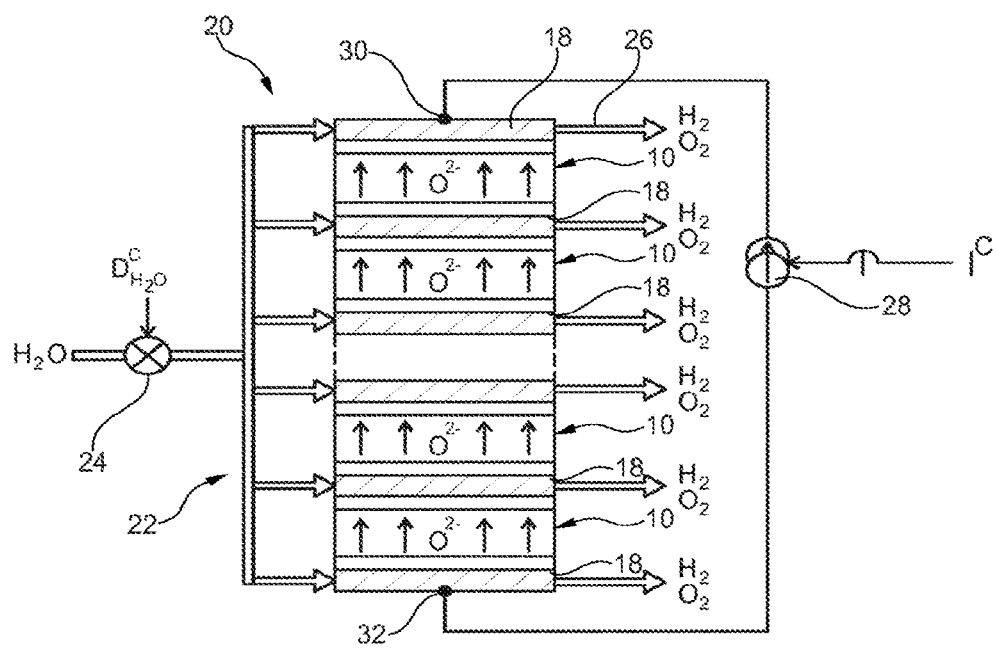
FIG. 2 is a schematic view of a stack of cells according to FIG. 1.
Figure 3:
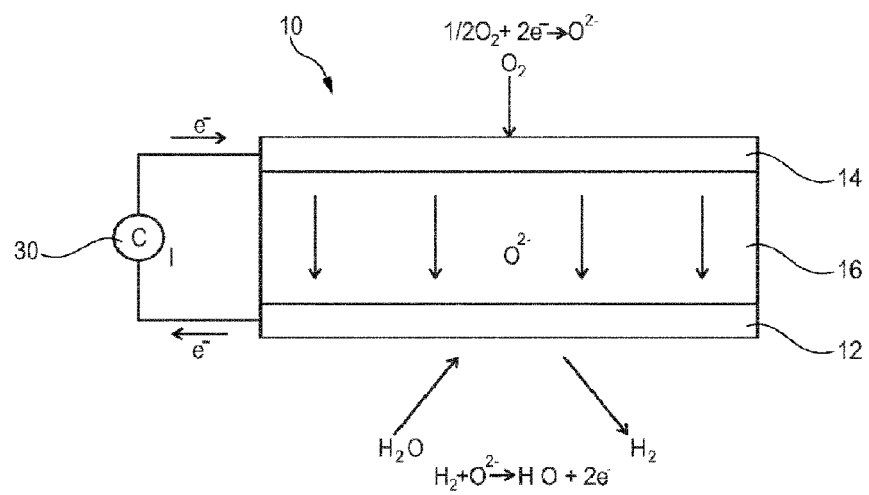
FIG. 3 is a schematic view of an electrochemical cell of an SOFC fuel cell stack.

FIGS. 1 to 3, which relate to the prior art, have already been commented on in the preamble. They are therefore not described below.

For the sake of clarity, the same elements of a stack for an HTE electrolysis reactor or SOFC fuel cell according to the prior art and of a stack 20 for an HTE electrolysis reactor operating reversibly as SOFC fuel cell, used as part of a system according to the invention are denoted by the same numerical references.

The description which will follow of the system according to the invention is given with reference to an HTE electrolyzer, in which the hydrogen electrodes are the cathodes, the oxygen electrodes are the anodes, and the chambers 21 are the chambers for the flow of steam and hydrogen or steam, hydrogen and carbon dioxide ($CO_2$) whilst the chambers 23 are chambers for the flow of the draining gas and the oxygen produced.

It goes without saying that in reverse SOFC fuel cell mode, the hydrogen electrodes are the anodes, the oxygen electrodes are the cathodes, the chambers 21 are the chambers for flow of the fuel whilst the chambers 23 are the chambers for circulation of the oxidant.

It will also be noted that the terms "upstream", "downstream", "inlet" and "outlet" are to be considered with respect to the flow direction of the gases.

It will also be noted that the electrolyzer operating reversibly as fuel cell described are of solid oxide type (SOEC, acronym of solid oxide electrolysis cell or SOFC, acronym of solid oxide fuel cell) operating at high temperature.

Thus, all the constituents (anode/electrolyte/cathode) of an electrolysis cell or fuel cell are ceramics. The high operating temperature of an SOEC electrolyzer (electrolysis reactor) or of an SOFC fuel cell is typically between 600° C. and 950° C.

Typically, the characteristics of an individual electrochemical cell suitable for the invention, of cathode-supported type (CSC) in SOEC electrolysis mode or of anode-supported type in SOFC fuel cell mode, may be those indicated as follows in the table below.

TABLE

| Electrolysis cell | Unit | Value |
|---|---|---|
| Cathode | | |
| Material from which it is made | | Ni-YSZ |
| Thickness | μm | 315 |
| Thermal conductivity | W m$^{-1}$ K$^{-1}$ | 13.1 |
| Electrical conductivity | Ω$^{-1}$m$^{-1}$ | 10$^5$ |
| Porosity | | 0.37 |
| Permeability | m$^2$ | 10$^{-13}$ |
| Tortuosity | | 4 |
| Current density | A · m$^{-2}$ | 5300 |
| Anode | | |
| Material from which it is made | | LSM |
| Thickness | μm | 20 |
| Thermal conductivity | W m$^{-1}$ K$^{-1}$ | 9.6 |
| Electrical conductivity | Ω$^{-1}$ m$^{-1}$ | 1 × 10$^4$ |
| Porosity | | 0.37 |
| Permeability | m$^2$ | 10$^{-13}$ |
| Tortuosity | | 4 |
| Current density | A · m$^{-2}$ | 2000 |
| Electrolyte | | |
| Material from which it is made | | YSZ |
| Thickness | μm | |
| Resistivity | Ωm | 0.42 |

Figure 4:
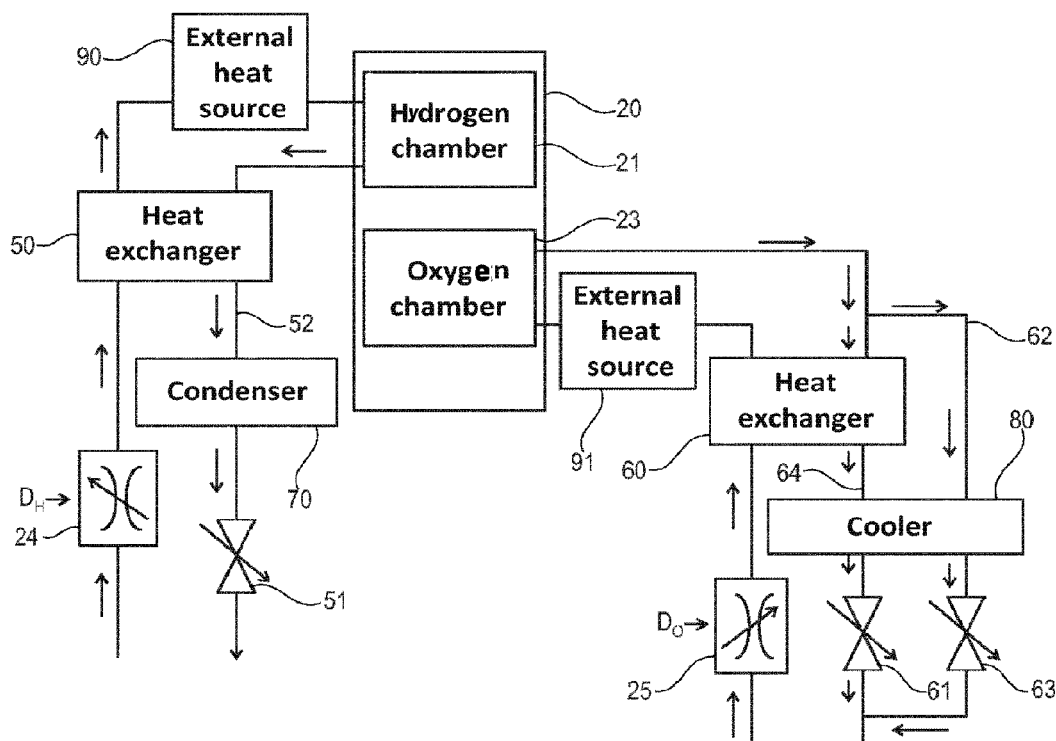
FIG. 4 is a schematic view of a system according to the invention comprising a stack of electrochemical cells operating as HTE electrolyzer and reversibly as SOFC fuel cell, the figure showing the components of the system for the control of the thermics and of the pressure.

With reference to FIG. 4, the system for controlling the thermics and the pressure according to the invention was used by the inventors such as it was used, as experimental prototype.

The system firstly comprises a high-temperature co-electrolysis or electrolysis (HTE) reactor comprising a stack 20 of individual solid oxide (co-)electrolysis cells each comprising a cathode, an anode, and an electrolyte inserted between the anode and the cathode, the cells being electrically connected in series, the stack comprising two electrical terminals 30, 32 for supplying current to the cells and defining flow chambers 21 for the flow of steam and hydrogen or steam, hydrogen and carbon dioxide ($CO_2$) over the cathodes and flow chambers 23 for the flow of air or of oxygen or of a mixture of oxygen-containing gases over the anodes.

The stack 20 is a stack having a number equal to 25 solid oxide electrochemical cells, each having a surface area equal to 100 cm$^2$.

The System Furthermore Comprises:

a supply line L1, capable of supplying the inlet of the chambers 21 with steam and hydrogen or steam, hydrogen and carbon dioxide ($CO_2$), at a flow rate $D_H$;

a second supply line L2, capable of supplying the inlet of the chambers 23 with air, with oxygen or a mixture of oxygen-containing gases, at a flow rate $D_O$;

a discharge line L3, capable of discharging the hydrogen produced at the outlet of the chambers 21;

a discharge line L4, capable of discharging the oxygen produced at the outlet of the chambers 23.

According to the invention, the system further comprises:

a heat exchanger 60, arranged between the supply line L2 and the discharge line L4, so as to recover the heat from the gases leaving the second chambers and transfer it to the gases entering these same chambers in order to preheat said gases;

a bypass line 62 of the discharge line L4, arranged between the inlet and the outlet of the exchanger 60, so as to divert all or some of the gases from the outlet of the chambers 23, the portion or all of the gases diverted not then flowing through the exchanger 60;

a flow control valve 63, capable of allowing through a flow rate of from 0 to 100%, arranged on the bypass line 62.

Another heat exchanger 50 is arranged between the supply line L1 and the discharge line L3, so as to recover the heat from the gases leaving the chambers 21 and transfer it to the gases entering these same chambers in order to preheat said gases.

A flow-rate regulator 24 arranged on the supply line L1, upstream of the exchanger 50 may regulate a gas flow rate as a function of the SOEC electrolyzer mode or of the SOFC fuel cell mode, preferably a hydrogen flow rate between 0 and 500 l/h, a steam flow rate between 0 and 1 m$^3$/h and a methane flow rate between 0 and 1.4 m$^3$/h.

A flow-rate regulator 25 arranged on the supply line L2, upstream of the exchanger 60 may regulate an air flow rate, preferably between 0 and 6 m³/h.

The heat exchangers 50 and 60 advantageously have an efficiency of 90%, they therefore make it possible to recover 90% of the heat from the outgoing gases in order to preheat the incoming gases.

The bypass line 62 may have an internal diameter typically of 10 mm and, as indicated above, makes it possible to circulate a portion of the hot gases leaving the oxygen chamber 23 without passing through the heat exchanger 60.

The valve 63 on the bypass line 62 regulates the amount of hot gas that flows without passing through the exchanger 60, which makes it possible to adjust the heat of the gases entering the oxygen chambers 23 and the pressure level of these oxygen chambers 23 at high air flow rate.

The flow control valve 51, capable of regulating a flow rate of from 0 to 100%, arranged on the discharge line L3, downstream of the outlet of the heat exchanger 50, therefore makes it possible to reduce the passage diameter of the discharge line L3. This results in an adjustable pressure drop, which is a function of the flow rate circulating in this line L3. This pressure drop downstream of the hydrogen flow circuit has an impact on all the upstream components, which makes it possible to regulate the pressure of the hydrogen chambers 21 and therefore to establish a pressure balance between the chambers 21 and the oxygen chambers 23, even for very different flow rates between these chambers.

The flow control valve 61, capable of regulating a flow rate of from 0 to 100%, arranged on the discharge line L4, downstream of the outlet of the heat exchanger 60, therefore makes it possible to reduce the passage diameter of the discharge line L4. This results in an adjustable pressure drop, which is a function of the flow rate circulating in this line L4.

This pressure drop downstream of the oxygen flow circuit has an impact on all the upstream components, which makes it possible to regulate the pressure of the oxygen chambers 23 and therefore to again establish a pressure balance between the chambers 23 and the hydrogen chambers 21, even for very different flow rates, even for very different flow rates between these chambers.

The condenser 70, arranged upstream of the valve 51 is sized in order to remove the steam from the gas mixture flowing in the discharge line L3 of the hydrogen chambers 21, and to enable operation of the valve 51 at cooled temperature, preferably at ambient temperature.

The condenser 70 may advantageously consist of a metal tube, through which the hot gases leaving the exchanger 50 flow, in a volume of cold water, typically at 12° C. A drain makes it possible to discharge the condensed water.

The cooler 80, arranged between the bypass line 62 and the discharge line L4 of the oxygen chambers 23, and upstream of the valves 61 and 63, is sized so as to cool the gas mixture flowing both in the bypass line 62 and in the discharge line L4 and to enable operation of said valves 61, 63 at cooled temperature, preferably at ambient temperature.

The cooler 80 may advantageously consist of a metal tube through which the hot gases leaving the exchanger 60 low and of a metal tube of the bypass line 62. These tubes are submerged in a volume of cold water, typically at 12° C. Drains make it possible to discharge the possible water condensed in the event of degraded operation of the stack 20.

Figure 5:
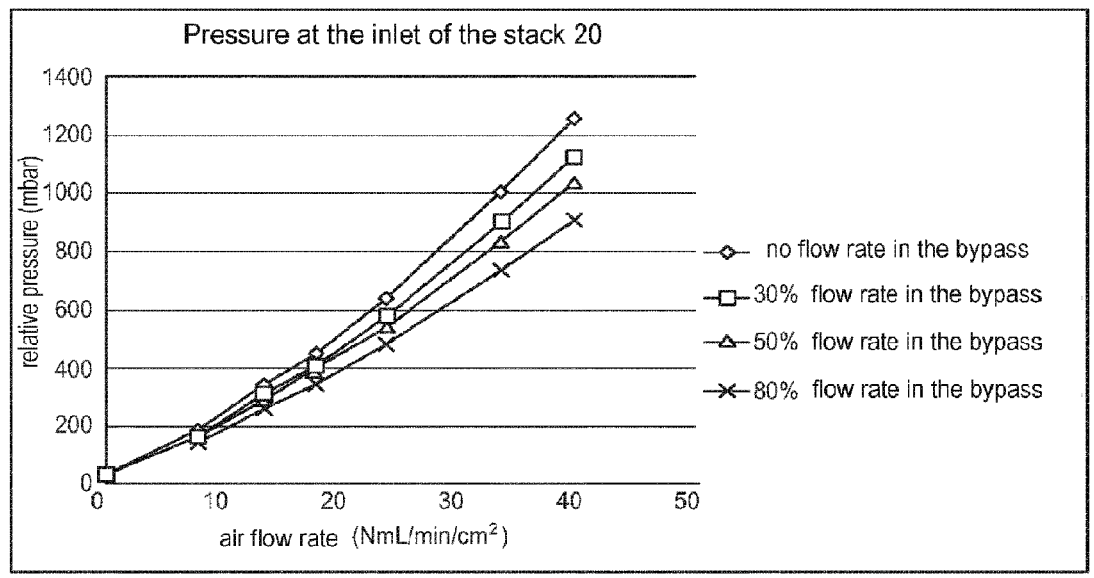
FIG. 5 illustrates, in the form of curves, the experimental results of the evolution of the pressure at the inlet of the stack according to the prior art, and according to the invention with a bypass line opened 50% or 100% respectively.

FIG. 5 shows the experimental results obtained regarding the measurement of the relative pressure between the hydrogen flow chambers 21 and oxygen flow chambers 23, respectively without the bypass line 62 (top curve), corresponding to a configuration according to the prior art, with the bypass line 62 opened 50% (central curve) and with the bypass line 62 opened 100%.

It therefore emerges from these comparative curves that the bypass line 62 according to the invention makes it possible to reduce the relative pressure between the hydrogen chambers 21 and oxygen chambers 23 significantly in the range of flow rates representative of the operation of an SOEC electrolyzer and of an SOFC fuel cell.

Figure 6:
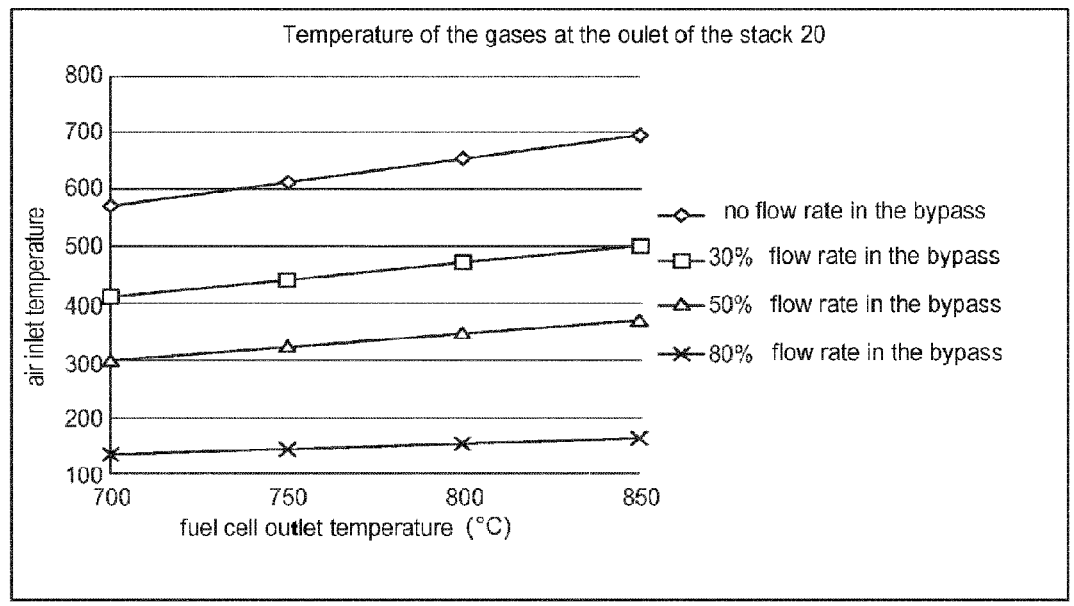
FIG. 6 illustrates, in the form of curves, the experimental results of the evolution of the temperature at the inlet of the stack at the air supply chambers according to the prior art, and according to the invention with a bypass line opened 50%.

FIG. 6 shows the experimental results obtained regarding the measurement of the temperature of the air at the inlet of the stack 20 operating in SOFC fuel cell mode, respectively with the bypass line 62 opened 50% (bottom curve) and with the bypass line 62 closed (bottom curve), the latter case corresponding to a configuration according to the prior art.

It therefore emerges from these comparative curves confirms that opening the valve 63 on the bypass line 62 makes it possible to reduce the temperature of the air at the inlet of the SOFC fuel cell and therefore to reduce the internal temperature of the stack 20. The more the valve 63 is opened, the greater the drop in the internal temperature of the stack.

Other variants and advantages of the invention may be applied without departing from the scope of the invention.

The invention is not limited to the examples that have just been described; features of the illustrated examples may especially be combined in variants that have not been illustrated.

The invention claimed is:

1. A system, comprising:
   a high-temperature electrolysis or co-electrolysis reactor comprising a stack of individual solid oxide (co-) electrolysis cells each comprising a cathode, an anode, and an electrolyte inserted between the anode and the cathode, the cells being electrically connected in series, the stack comprising two electrical terminals for supplying current to the cells and defining, on the cathodes, first flow chambers and, on the anodes, second flow chambers;
   at least one first supply line, capable of supplying the inlet of the first chambers with a mixture of steam and hydrogen or with a mixture of steam, hydrogen and carbon dioxide ($CO_2$), at a flow rate $D_H$;
   at least one second supply line, capable of supplying the inlet of the second chambers with air or with oxygen or with a mixture of oxygen-containing gases, at a flow rate $D_o$;
   at least one first discharge line, capable of discharging hydrogen produced at an outlet of the first chambers;
   at least one second discharge line, capable of discharging oxygen produced at an outlet of the second chambers;
   a first heat exchanger, arranged between the second supply line and the second discharge line, so as to recover heat from gases leaving the second chambers and transfer the heat to gases entering these same chambers in order to preheat said gases;
   a bypass line of the second discharge line, arranged between the inlet and the outlet of the exchanger, so as to divert all or some of the gases from the outlet of the second chambers, the portion or all of the gases diverted not then flowing through the exchanger; and
   a flow control valve, capable of allowing through a flow rate of from 0 to 100%, arranged on the bypass line.

2. The system as claimed in claim 1, which operates reversibly in electrolysis mode, and in fuel cell mode, optionally with internal methane reforming.

3. The system as claimed in claim 1, further comprising
a second heat exchanger, arranged between the first supply line and the first discharge line, so as to recover heat from the gases leaving the first chambers and transfer the heat to the gases entering these same chambers in order to preheat said gases.

4. The system as claimed in claim 3, further comprising
a second flow control valve, capable of controlling a flow rate of from 0 to 100%, arranged on the first discharge line downstream of the outlet of the second heat exchanger.

5. The system claim 4, further comprising
a condenser arranged upstream of the second valve and sized in order to remove steam from a gas mixture flowing in the first discharge line of the first chambers, and to enable operation of the second valve at a cooled temperature.

6. The system as claimed in claim 1, further comprising
a third flow control valve, capable of controlling a flow rate of from 0 to 100%, arranged on the second discharge line downstream of the outlet of the first heat exchanger.

7. The system as claimed in claim 6, further comprising
a cooler arranged between the bypass line and the second discharge line of the second chambers, and upstream of the first and third valve, the cooler being sized so as to cool the gas mixture flowing both in the bypass line and in the second discharge line and to enable operation of said first and third valves at a cooled temperature.

8. The system as claimed in claim 7, wherein the cooler is a condenser comprising a device for purging condensed liquid water.

9. The system as claimed in claim 1, further comprising
a first external heat source arranged on the first supply line at the inlet of the first chambers, optionally downstream of the second heat exchanger, to provide additional heat, in order to supplement the heating of the gases on said first supply line.

10. The system as claimed in claim 1, further comprising
a second external heat source arranged on the second supply line at the inlet of the second chambers, and downstream of the first heat exchanger, to provide additional heat, in order to supplement the heating of the gases on said second supply line.

11. A system, comprising:
a high-temperature fuel cell comprising a stack of individual solid oxide electrochemical cells each comprising an anode, a cathode, and an electrolyte inserted between the anode and the cathode, the cells being electrically connected in series, the stack comprising two electrical terminals for recovering current from the cells and defining, on the anodes, first flow chambers and, on the cathodes, second flow chambers;
at least one first supply line, capable of supplying the inlet of the first chambers with dihydrogen or with another fuel gas or a mixture containing a fuel gas, at a flow rate $D_H$;
at least one second supply line, capable of supplying the inlet of the second chambers with air or with oxygen or with a mixture of oxygen-containing gases, at a flow rate $D_o$;
at least one first discharge line, capable of discharging excess dihydrogen or other fuel at an outlet of the first chambers;
at least one second discharge line, capable of discharging excess air or oxygen or mixture of oxygen-containing gases at an outlet of the second chambers;
a first heat exchanger, arranged between the second supply line and the second discharge line, so as to recover heat from the gases leaving the second chambers and transfer the heat to the gases entering these same chambers in order to preheat said gases;
a bypass line of the second discharge line, arranged between the inlet and the outlet of the exchanger, so as to divert all or some of the gases from the outlet of the second chambers, the portion or all of the gases diverted not then flowing through the exchanger; and
a first flow control valve, capable of controlling a flow rate of from 0 to 100%, arranged on the bypass line.

12. The system as claimed in claim 11, further comprising
a second heat exchanger, arranged between the first supply line and the first discharge line, so as to recover heat from the gases leaving the first chambers and transfer the heat to the gases entering these same chambers in order to preheat said gases.

13. The system as claimed in claim 11, further comprising
a first external heat source arranged on the first supply line at the inlet of the first chambers, optionally downstream of the second heat exchanger, to provide additional heat, in order to supplement the heating of the gases on said first supply line.

14. The system as claimed in claim 11, further comprising
a second external heat source arranged on the second supply line at the inlet of the second chambers, and downstream of the first heat exchanger, to provide additional heat, in order to supplement the heating of the gases on said second supply line.

* * * * *